E. S. DE PUY.

COMPOSITE LETTER AND ATTACHMENT.

APPLICATION FILED DEC. 16, 1910.

Reissued Feb. 11, 1913.

13,525.

WITNESSES

H. E. Stone

E. R. Blake.

INVENTOR

EDWARD S. DE PUY.

BY Carlos P. Griffin ATTY.

UNITED STATES PATENT OFFICE.

EDWARD S. DE PUY, OF OAKLAND, CALIFORNIA.

COMPOSITE LETTER AND ATTACHMENT.

13,525. Specification of Reissued Letters Patent. Reissued Feb. 11, 1913.

Original No. 947,377, dated January 25, 1910, Serial No. 470,535. Application for reissue filed December 16, 1910. Serial No. 597,737.

*To all whom it may concern:*

Be it known that I, EDWARD S. DE PUY, citizen of the United States, residing at Oakland, in the county of Alameda and State of California, have invented a new and useful Composite Letter and Attachment, of which the following is a specification in such full and clear terms as will enable those skilled in the art to construct and use the same.

My invention relates to letters, figures, or characters of any description, means for reinforcing and attaching said letters or characters, and supports therefor.

It comprises combinations of parts, and details of construction which will be more fully explained by reference to the accompanying drawings, in which—

Figure 1:
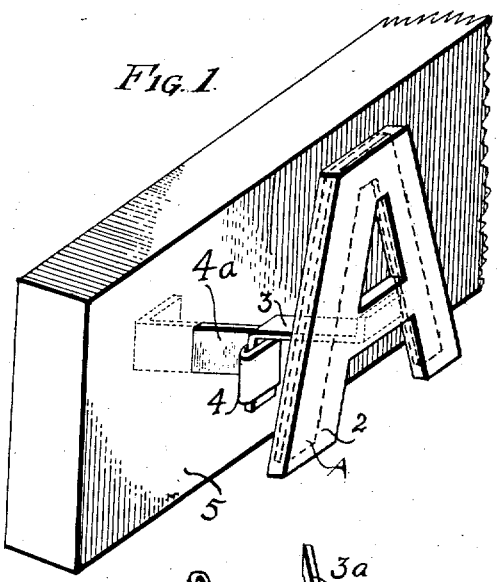
Figure 2:
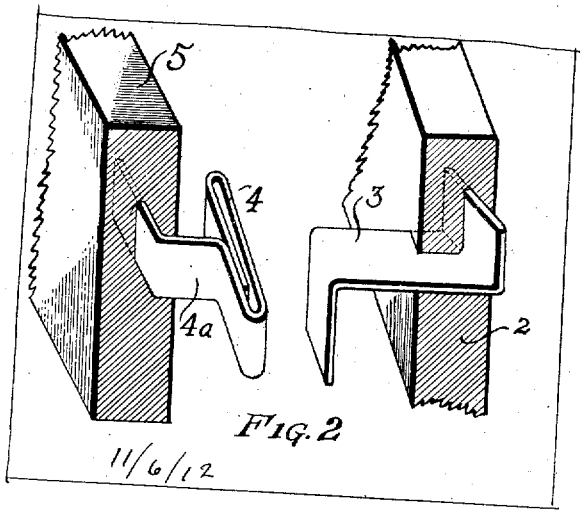
Figure 2:
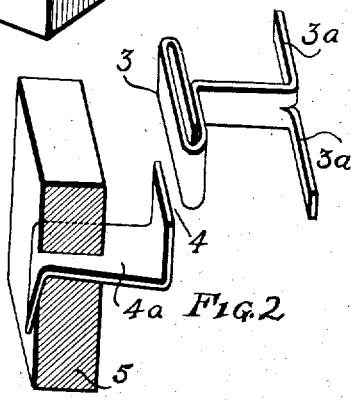

Figure 1 is a perspective view showing a support and the letter attached. Fig. 2 shows sectional views of the same. Figs. 2, 3, 4 and 5 are modifications. Fig. 6 is a separate view of a reinforcing device, and attaching means The letters, figures or characters of whatever description may be made of any suitable plastic material which can be molded, and will afterward harden.

In order to strengthen such material so as to prevent breakage by accident, I reinforce the character, whatever may be its description, by reinforcing strip or strips A, these having a form depending upon the form of the character, and they are embedded in the material when the letter is formed so as to properly strengthen it.

In order to attach the character, one of which is represented at 2, I form tongues, loops, or projections in any desired manner, as shown at 3; and these engage with corresponding projections 4 properly formed for the purpose. Thus, the projecting portion 4 may be supported from a suitable fixture 5; and this fixture may be made either of plastic material hardened, or of wood, or metal.

If made of plastic material, the engaging portion 4 is made with a shank or extension as shown at $4^a$, and this may enter into the material of the support, and be fixed therein when this material hardens.

If the support 5 be made of wood, or other penetrable material, the shank $4^a$ may be so made as to be driven into the support, and the inner end, if driven through, may be turned over so as to firmly lock it in place, as shown in Fig. 2.

Figure 4:
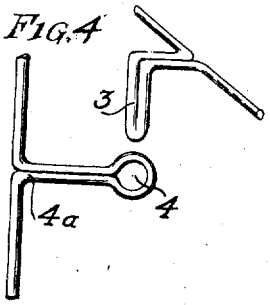
Figure 5:
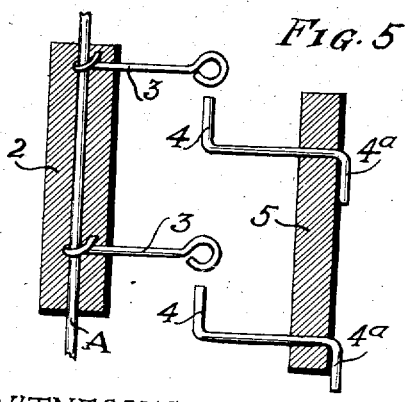
Figure 6:
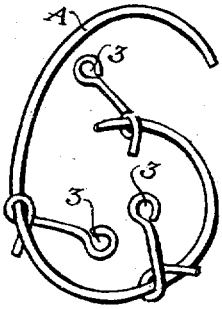

As shown in Figs. 1, 4 and 5, the support is in the form of loops or eyes made either from sheet metal, of sufficient thickness and rigidity, bent to form oval openings, or by the use of sufficiently large wires or rods bent into the form of eyes, and the connection 3 for the letter or character is in the form of a shank projecting from the character and having a downwardly bent projection which will enter the loop or eye from the supporting part.

Figure 3:
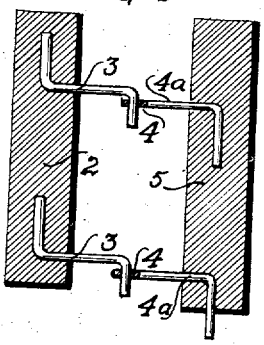

In Figs. 2 and 3, the fixed part or support is in the form of an upwardly bent tongue having its inner end secured in the support, and the engaging part 3 is in the form of a loop adapted to fit the upturned portion of the tongue; the shank and the loop extending into the letter or character and having outwardly turned portions $3^a$ which are embedded in the material of the character so as to hold it firmly. By this construction I am enabled to provide for the easy attachment of letters, figures, or characters for sign or other work, and the equally easy removal of such characters for repair or replacement. It will be understood that this construction may be employed for any like or equivalent structures to which it is applicable.

Having thus described my invention, what I claim and desire to secure by Letters Patent is:—

In a sign, characters formed of a plastic material which will set, an internal reinforce in said characters substantially conforming to the general outline thereof and connected to said plastic material, and strips having one portion embedded in the material of which the letters are formed and having another portion projecting outwardly to interlock with a coacting support, substantially as described.

In testimony whereof I have hereunto set my hand this 5 day of December, in the presence of two subscribed witnesses.

EDWARD S. DE PUY.

Witnesses:

C. P. GRIFFIN,

R. J. CRAKER.